Nov. 14, 1967     A. DASCANIO     3,352,461
TRANSPORTABLE WATER TOWER
Filed April 19, 1966     2 Sheets-Sheet 1
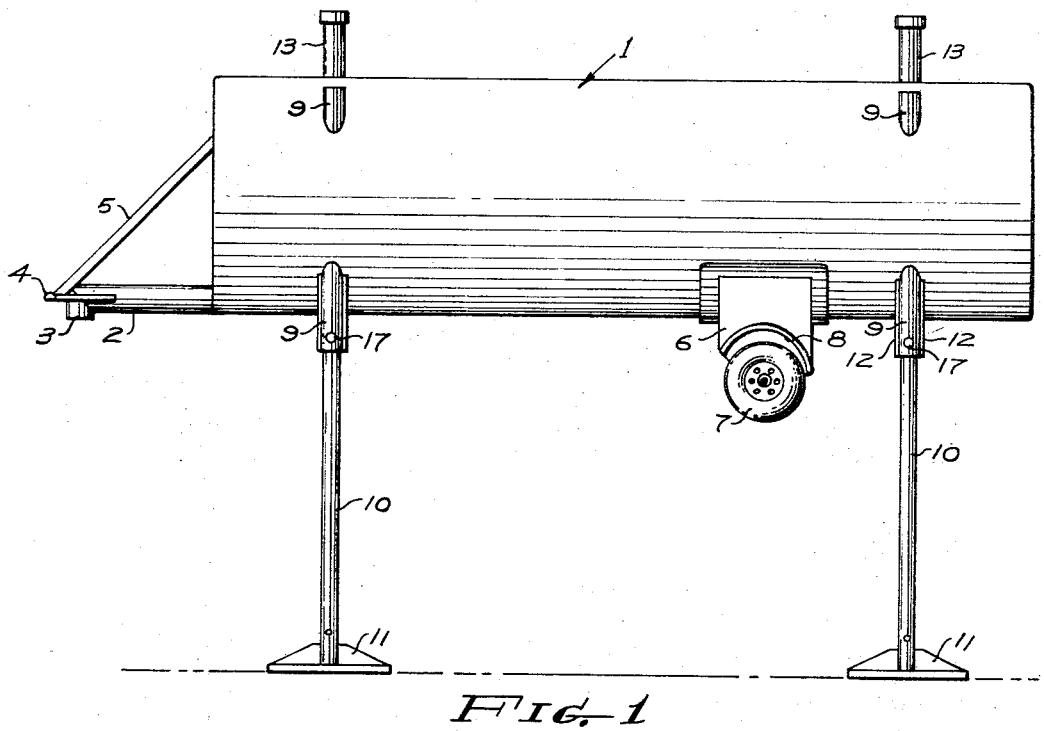
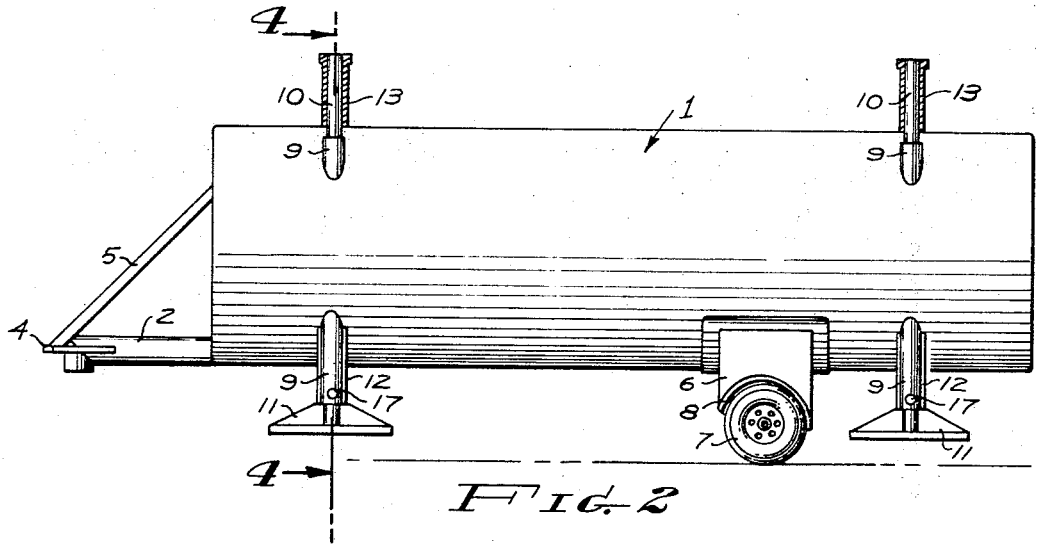
ADOLFO DASCANIO
INVENTOR.
BY *Lyon & Lyon*
ATTORNEYS Nov. 14, 1967 A. DASCANIO 3,352,461
TRANSPORTABLE WATER TOWER
Filed April 19, 1966 2 Sheets-Sheet 2

ADOLFO DASCANIO
INVENTOR.

BY
ATTORNEYS

United States Patent Office 3,352,461
Patented Nov. 14, 1967

3,352,461
TRANSPORTABLE WATER TOWER
Adolfo Dascanio, Los Angeles, Calif., assignor to Southwest Welding & Manufacturing Co., Alhambra, Calif., a corporation of California
Filed Apr. 19, 1966, Ser. No. 543,613
5 Claims. (Cl. 222—160)

This invention relates to transportable water towers, and included in the objects of this invention are:

First, to provide a transportable water tower in which an elongated cylindrical water tank is equipped with a set of trailer wheels, and is provided with a forwardly extending discharge spout at the extremity of which is a trailer hitch, so that the water tank itself forms the chassis, and a separate chassis or other exterior framework is eliminated.

Second, to provide a transportable water tower of this type having a set of telescoping supports, and a hydraulic elevating means, the supports adapted to occupy a raised position to clear the ground so that the tower may be transported and an extended position to support the tank in a raised position.

With the above and other objects in view as may appear hereinafter reference is directed to the accompanying drawings in which:

FIGURE 1 is a side view of the transportable water tower shown in its raised position.

FIGURE 2 is a side view thereof with a water tower shown in its lower position in condition for transportation.

Figures 3, 4:
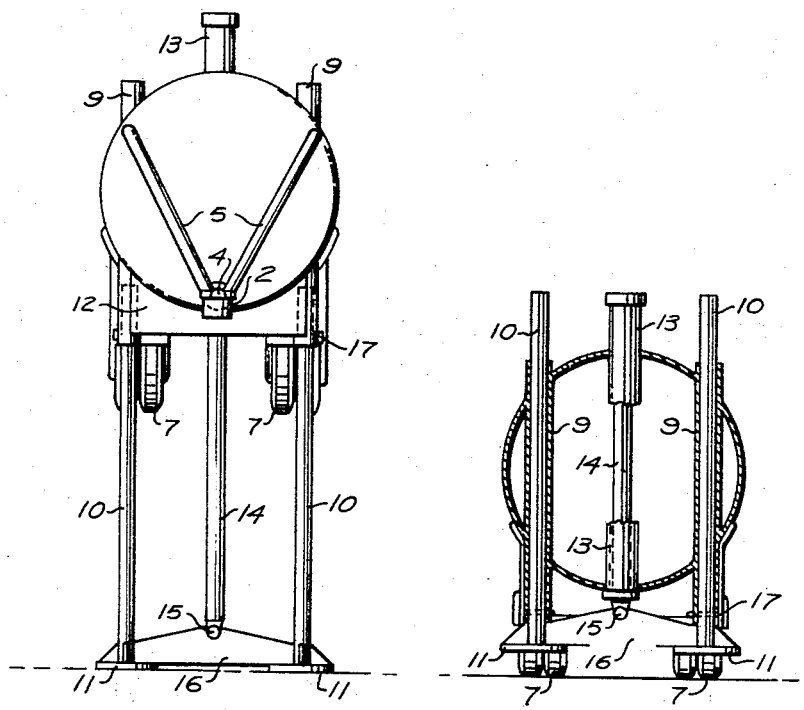
FIGURE 3 is a front view of the transportable water tower shown in its raised position.
FIGURE 4 is a transverse sectional view thereof taken through 4—4 of FIGURE 2 showing the water tower in its lower position.

The transportable water tower includes a tank 1 preferably in the form of an elongated cylinder however the tank may be square or rectangular in cross-section. The tank occupies a horizontal position and is provided with a spout 2 extending forwardly from the lower side of its forward end. The spout terminates in a downwardly extending discharge opening 3. The spout is provided with a valve (not shown).

Secured to the forward extremity of the spout 2 is a trailer hitch 4 and extending upwardly from the trailer hitch to the forward wall of the tank are a pair of braces 4a so that a portion of the weight of the tank may be readily carried by the trailer hitch 4.

Located about one-third of the length of the tank from the rear end thereof is a trailer wheel mounting structure 5, the upper portion of which is arcuate to conform to the curvature of the tank. The mounting structure supports or is supported by a set of trailer wheels 7, depending on the position of the tank 1, connected to the mounting structure in any conventional manner. Fenders 8 overlie the trailer wheels.

The tank 1 is so constructed as to form a rigid structure so that the tank itself constitutes the only connection between the spout 2 and the wheels 7. That is, no frame structure externally or internally of the tank is required.

Located near the forward and rearward ends of the tank is a set of vertically extending guide tubes 9 arranged in forward and rearward pairs. The guide tubes are set inwardly from the sides of the tank and their upper and lower extremities extend beyond the walls of the tank; that is, the extremities of the guide tubes are exposed. Each guide tube slidably receives a supporting member 10 which may likewise be tubular. Secured to the lower end of each supporting member is a pad 11.

The lower protruding portion of the forward and rearward pairs of guide tubes 9 are joined by transversely extending gusset plates 12. Disposed in a plane common to the forward and rearward pairs of guide tubes 9 and centered with respect to the tank 1 is a pair of vertically extending hydraulic cylinders 13 which protrude through the tank. Each hydraulic cylinder is provided with a piston (not shown) joined to the upper end of a thrust rod 14 which extends downwardly through and beyond the hydraulic cylinder. The lower end of each thrust rod is joined by a clevis pin or other connecting means 15 to a yoke plate 16 which extends laterally and is joined to the lower end of a pair of supporting members 10.

The telescoping supporting members 10 may be secured in their raised positions or in any selected extended position by means of fastening pins 17 extending through the lower portions of the guide tubes 9 and through corresponding holes provided in the supporting members 10.

Operation of the transportable water tower is as follows: When it is desired to transport the water tower the pads 11 are raised by the hydraulic cylinders 13 and secured in position by the fastening pins 17. When the pads are raised the tank 1 rests on the trailer wheels 7 as shown in FIGURES 2 and 4 and a trailer hitch 4 may be connected in a conventional manner to a tractor vehicle.

When the water tower has been transported to the point of use, the hydraulic cylinders 13 are operated to thrust the supporting members 10 downward causing the tank 1 to raise to the desired level such as that shown in FIGURES 1 and 3. The fastening pins 17 are again used to secure the supporting members 10 in the guide tubes 9.

The tank 1 is raised and lowered in an empty condition to minimize the load imposed on the hydraulic cylinders 13. When the tank is in use, the load is carried entirely by the fastening pins 17 and the pressure in the hydraulic cylinders 13 is relieved. Hydraulic fluid is supplied to the cylinders from a suitable conventional source which may be contained in a unit mounted on the tank, for instance, on the spout 2 or the hydraulic power unit may be an independent unit temporarily connected to the hydraulic cylinders when it is desired to raise and lower the tank.

While a particular embodiment of this invention has been shown and described, it is not intended to limit the same to the details of the construction set forth, but instead, the invention embraces such changes, modifications and equivalents of the various parts and their relationships as come within the purview of the appended claims.

What is claimed is:
1. A transportable water tower comprising:
  (a) an elongated water tank having a horizontal axis;
  (b) a spout at its forward end;
  (c) a trailer hitch carried by said spout for supporting the forward end of said tank;
  (d) a trailer wheel mounting structure secured to said tank, said tank and spout forming the sole connection between said mounting structure and said trailer hitch;
  (e) means for supporting said tank in a raised position;
  (f) and trailer wheels connected to said mounting structure for supporting said tank for transportation, said wheels being suspended from said mounting structure when said tank is raised.

2. A transportable water tower according to claim 1, wherein:
   (a) said tank supporting means includes a set of vertical tubes extending through said tank, a set of supporting members slidable in said tube and supporting pads at the lower ends of said slidable members, said members being movable between an upper position wherein said pads clear an underlying surface when said trailer wheels rest thereon, and a lower position wherein said tank is supported in a raised position.

3. A transportable water tower according to claim 2, which further includes:
   (a) hydraulic cylinders extending vertically through said tank;
   (b) thrust rods slidable in said hydraulic cylinders;
   (c) and connecting means between said thrust rods and said slidable supporting members to raise and lower tank supporting means.

4. A transportable water tower according to claim 1, wherein:
   (a) each tank supporting means includes a vertical tube extending through said tank, a supporting member slidable in said vertical tube, and rods at the lower end of said supporting member, said tank supporting means being arranged in pairs near the forward and rearward ends of said tank.

5. A transportable water tower according to claim 4, which further includes:
   (a) hydraulic cylinders disposed between the forward and rearward pairs of said tank supporting means;
   (b) a thrust rod for each cylinder;
   (c) and a connecting yoke joining each thrust rod to a pair of said slidable supporting members;
   (d) said thrust rods operable to raise said pads clear of an underlying surface for transportation of said tank on said wheels and for raising said tank on said slidable supporting members.

References Cited
UNITED STATES PATENTS

| | | | |
|---|---|---|---|
| 2,724,597 | 11/1955 | Fowler | 280—5 |
| 3,033,523 | 5/1962 | Mulholland | 254—86 |
| 3,160,171 | 12/1964 | Klein | 137—344 |
| 3,201,087 | 8/1965 | Dalton | 254—86 |
| 3,266,675 | 8/1966 | Willis | 222—160 |
| 3,315,929 | 4/1967 | Keiser | 248—129 |

LEO FRIAGLIA, *Primary Examiner.*